United States Patent Office 2,945,823
Patented July 19, 1960

2,945,823
STABILIZED DEHYDROGENATION CATALYST

Edward B. Cornelius, Swarthmore, Thomas H. Milliken, Jr., Moylan, and George Alexander Mills, Swarthmore, Pa., assignors to Houdry Process Corporation, Wilmington, Del., a corporation of Delaware No Drawing. Filed May 22, 1957, Ser. No. 660,751

2 Claims. (Cl. 252—450)

This invention relates to a chromia-on-alumina catalyst prepared in such a manner and of such a composition as to possess a combination of stability, selectivity and activity industrially more attractive than the combination of stability, selectivity and activity of competitively marketed chromia-on-alumina catalysts.

The activity of a dehydrogenation catalyst is measured by the percentage of hydrocarbon feed undergoing reaction at particular conditions. The selectivity of such a catalyst is measured by the percentage of the desired product in the total converted products. The percentage of desired product relative to the feed is thus the product of the activity and selectivity factors.

The selectivity and activity of a catalyst decline from their maxima during prolonged use of a catalyst, and it is eventually necessary to replace a catalyst. An unstable catalyst has a rapid rate of decline of selectivity and/or activity, necessitating catalyst replacement after an objectionably short period of use.

It is generally profitable to replace a catalyst before it is completely inactivated, thereby obtaining the higher operating revenues attributable to fresh catalyst. Good engineering judgment must be exercised in evaluating the overall cost of catalyst replacement in relation to the overall loss of revenue from using a partially deactivated catalyst undergoing further deactivation progressively. Accordingly, reliable estimates of the future pattern of decline of a partially deactivated catalyst are valuable to the supervisor of a dehydrogenation plant. Such supervisors prefer to employ catalysts whose patterns of decline are reliably known in preference to novel catalysts, possibly having an initial superiority but of unpredictable stability. Hence it has been necessary to provide data relating to stability characteristics in order to interest prospective customers in novel catalysts. The stability of a catalyst controls the duration of the maximum operating period possible before the decline in the activity and/or the decline in the selectivity of the catalyst makes it profitable to replace the catalyst. One possible method of determining whether a new catalyst possesses satisfactory stability would involve industrial use for approximately one year and calculating whether, in view of the pattern of decline in selectivity and activity, an earlier catalyst replacement would have been more profitable. However, ordinarily it is not practical to use such a prolonged and/or potentially expensive testing procedure. A satisfactorily reliable measure of the stability of a catalyst is obtained by accelerated aging tests involving severe treatment at elevated temperatures for relatively short testing times. Because data correlating the performance of a partially deactivated butane dehydrogenation catalyst with the surface area of the catalyst are also applicable to the surface are data subsequent to artificial aging tests, the catalyst stability estimation is greatly simplified. It is necessary to determine either the surface area after a standard accelerated aging test or to determine what period of accelerated aging is necessary to reduce the surface area to a suitable standard.

Solid inorganic contact material having a significant surface area, such as within the range from about 1 $m.^2/g.$ to about 600 $m.^2/g.$ can be described as porous solid material. Heretofore, it has been known that such porous solid material tends to undergo a transformation to a relatively low surface area material when subjected to sufficiently elevated temperatures for a sufficiently long period of time. Heretofore, it has been known that steam, acidic gases, and/or other reactive gases accelerated the loss of surface area more than inert gases. Stabilizers are materials incorporated in high surface area contact material primarily for the purpose of decreasing the loss of surface area at elevated temperatures. Such stabilized porous solids undergo a lower rate of decline of surface area at appropriate temperatures.

Even before the function of a stabilizer was fully appreciated, there were descriptions of catalyst compositions which, with modern knowledge, can be interpreted as comprising stabilizers. Bates, 2,395,836, employs silica to stabilize a molybdena-on-alumina catalyst. Frey et al., 2,098,959, describes the dehydrogenation of butane over a catalyst consisting of alumina, chromia, and a minor amount of thallium oxide, and explains that silica is also capable of stabilizing chromia gel type catalysts. Lang, 2,487,564, emphasizes the advantage of using about 1% to 10% silica gel in chromia-alumina catalyst compositions containing more (as distinguished from less) alumina than chromia. Thomas, 2,592,765, and companion hydrocarbon conversion process Patent 2,444,965, disclose a catalyst which would contain 17.2% molybdena, 64.4% alumina and 18.4% reaction product attributable to the kaolin. Notwithstanding the numerous references in the literature to various procedures utilizing siliceous materials for stabilizing predominantly alumina catalysts, catalyst chemists have established that the thermal stability of a catalyst composition is quite unpredictable and can be established only by empirical tests.

Heretofore, kaolin, montmorillinite, and certain other clays have been proposed as stabilizers and/or minor components of chromia-on-alumina catalyst.

Heretofore, water-swellable bentonite clay has been proposed as useful for a variety of purposes, in substantially all of which purposes, the bentonite was employed in alkaline aqueous systems, neutral systems, or only slightly acidic systems.

This application is a continuation-in-part of our abandoned application, Serial No. 510,868, filed May 24, 1955, entitled Extruding Attrition Resistant Alumina Particles, which contains subject matter in common with our application, Serial No. 664,713, filed June 10, 1957, entitled Extruding Attrition Resistant Alumina Particles, now Patent No. 2,809,170.

In accordance with the present invention, a chromia-on-alumina catalyst is prepared by the method comprising; preparing an aqueous solution of nitric acid; dispersing a swelling, water-dispersible bentonite in the aqueous nitric acid; forming a mixture of alumina trihydrate powder and a quantity of aqueous nitric acid dispersion of bentonite sufficient to provide in the dehydrated alumina from .0.5% to 2% bentonite; subjecting said mixture to extrusion to form pellets; converting the extruded pellets to gamma alumina pellets by an elevated temperature partial dehydration treatment; reducing the surface area of the gamma alumina pellets to the range from about 60 $m.^2/g.$ to about 100 $m.^2/g.$ by treatment at temperature conditions more severe than employed in preparing said gamma alumina, said alumina pellets constituting stabilized alumina carrier particles, the stabilization being attributable to the reaction product of said controlled amount of bentonite with the alumina; impregnating the stabilized alumina carrier particles of reduced surface area with chromic acid solution; and calcining the chromic acid impregnated alumina pellets.

Additional clarification of the technical subject matter pertinent to the present invention is achieved by a consideration of a series of examples.

EXAMPLE I

In order to provide a control process illustrative of the results obtained in the absence of the present invention, a dehydrogenation catalyst is prepared in accordance with a procedure providing a dehydrogenation catalyst superior to competitively available commercial catalysts.

A large batch of medium strength nitric acid is prepared by mixing 53.37 parts of commercial (67%) nitric acid and 18 parts deionized water. A Lancaster type of mixer is partially filled wtih 400 pounds of Reynolds brand of alumina trihydrate. The powder is stirred while being sprayed with said medium strength nitric acid solution, thereby impregnating the powder with 9% nitric acid (100% basis). The quantity of liquid thus introduced into the powder is not sufficient to convert it into a paste, and the impregnated alumina trihydrate retained its powdery characteristics. It order to assure thorough mixing, the impregnated powder is mulled in the Lancaster mixer for several minutes. The nitric acid and alumina trihydrate are allowed to undergo a chemical reaction for a period of time such as about five hours. The thus reacted material retains its powdery characteristics, and readily flows as a powder when fed to an extruding machine. This powder is compressed in the extruder. Under such pressure, cohesive and somewhat plastic strands of dough are formed. These extruded strands are sliced, thereby forming pellets which are sufficiently cohesive and sufficiently free from troublesome adhesiveness to be handled in the dryer. The pellets are rapidly dried for about 15 minutes at about 270° F., a dry gas passing through the bed of particles at a space velocity of about 12 v./v./hr. The thus dried pellets are dehydrated by gradually increasing the temperature from about 200 to 800° F., in the presence of more than 50% steam, the steam being withdrawn by a supplementary stream of auxiliary gas at a low space rate, whereby a major portion of the hydrate water was removed from the particles and whereby the particles developed large surface area gamma alumina characteristics. In the apparatus employed, the rate of auxiliary gas was such that the requirement for 50% steam in the dehydration zone was met by the steam evolved by the dehydration of the alumina trihydrate, but additional steam might be used in conducting this step in other apparatus.

The surface area of the thus prepared gamma alumina is about 200 m.$^2$/g. or about 2½ times the surface area of the pellets subjected to chromic acid impregnation in accordance with the present invention. The surface area of the particles is adjusted by treating a bed of pellets gravitating at about 2 feet per hour through about 8 feet of a zone supplied with 1350° F. steam at atmospheric pressure, thus preparing pellets having a surface area of about 80 m.$^2$/g., which readily sorb 45.5 pounds of water per 100 pounds of pellets under immersion conditions.

The gamma alumina particles having a surface area of about 80 m.$^2$/g., prepared as previously indicated, are impregnated wtih an aqueous solution of chromic acid by the excess solution technique. A kettle mounted for rotation about a horizontal axis (thus permitting easy drainage) is supplied with about 4 cubic feet of said alumina pellets and with sufficient chromic acid solution (containing 47% $CrO_3$) to provide about 6.2 cubic feet of the mixture. The pellets are soaked in the mixture for about 10 minutes., and then drained to remove the excess solution. The particles sorb sufficient aqueous chromic acid solution to provide in the completed catalyst a chromia content of about 20%.

The aqueous solution of chromic acid is prepared by mixing a technical grade (99.8% pure) chromic anhydride ($CrO_3$) with a mixture of demineralized water and recycle solution, agitating the chromic acid solution, and subsequently diluting the solution with additional demineralized water to adjust the concentration to 47% chromic anhydride. The excess solution not adsorbed by the catalyst is recycled for use in making up subsequent batches of impregnation solution.

After the particles are impregnated with chromic acid, they are dried at a temperature between about 250° F. and about 300° F. in a dryer having surfaces resistant to corrosion by the hot chromic acid. The thus dried particles are then calcined at 1400° F. during a period of 10 hours in the presence of a mixture of about 80% air and 20% steam. This finished catalyst has a surface area of about 55 m.$^2$/g., and a combination of activity, selectivity, and stability superior to competitively available chromia-alumina catalysts.

A small portion of the calcined catalyst is subjected to an accelerated aging test by treatment with a mixture of 20% steam and 80% air at a temperature of 1600° F. for two hours, thereby reducing the surface area from about 55 m.$^2$/g., to about 15 m.$^2$/g. Such loss of surface area during a standard accelerated aging measurement provides a standard (indicative of the absence of a stabilizer) for measuring the effectiveness of methods for stabilizing the catalyst.

EXAMPLE II

A 20% chromia-on-alumina dehydrogenation catalyst was prepared following the procedure of Example I and impregnating the alumina trihydrate with the same water content and the same nitric acid content as the impregnated powder of Example I the difference being that in Example II, the alumina trihydrate was sprayed in two stages. The alumina trihydrate first was sprayed with commercial 67% nitric acid and thereafter was sprayed with an aqueous dispersion of sodium bentonite to provide 1.0% bentonite in the finished catalyst carrier which initially had a surface area of 80 m.$^2$/g. After the standard accelerated aging treatment of this catalyst, the surface area was about 15 m.$^2$/g., thus indicating that no measurable stabilizing effect was achieved when the bentonite was dispersed merely in water prior to mixing with the alumina trihydrate. Because sodium bentonite swells upon dispersion in water, the mixture is viscous and difficult to spray evenly. Such uneven distribution of the bentonite may have contributed to the failure to achieve a measurable stabilizing effect.

EXAMPLE III

A 20% chromia-on-alumina catalyst was prepared following the procedure of Example I except that sodium bentonite was included in the medium strength nitric acid solution sprayed upon the alumina trihydrate in the Lancaster mixer. The alumina particles had a surface area of 80 m.$^2$/g. prior to chromic acid impregnation. The chromia-on-alumina catalyst particles were subjected to the standard accelerated aging treatment. The catalyst granules were treated at 1600° F. with 20% steam for two hours. The chromia-on-alumina catalyst then possessed a surface area of about 36 m.$^2$/g., thus indicating that this method (dispersing bentonite in nitric acid, then impregnating into alumina trihydrate) of stabilizing the chromia-alumina catalyst was very effective.

EXAMPLE IV

Several modifications of catalyst were prepared following the method of Example III but using various amounts of bentonite. In each case, a controlled amount of sodium bentonite was dispersed into the medium strength nitric acid solution prior to impregnation of the alumina trihydrate. The gamma alumina pellets were impregnated with chromic acid and catalyst particles were prepared. The catalyst particles were subjected to the standard artificial aging treatment. After accelerated aging, the catalysts were elevated by two procedures, including surface area measurements, and also by the more expensive and measurements of the usefulness of the catalyst for dehydrogenating butane. The catalysts were employed in a standard test for the dehydrogenation of butane. These dehydrogenation tests of the artificially aged catalysts containing controlled amounts of sodium bentonite demonstrated that the catalyst containing 1% sodium bentonite was superior to either the catalyst containing 0.5% sodium bentonite or the catalyst containing 2.0 sodium bentonite. Data relating to the conversion, coke production, butadiene selectivity, and butene selectivity of the three catalysts before and after the accelerated aging treatment are shown in Table I, which also shows some stability index (S.I.) data. The datum for the aged catalyst can be expressed as a percentage of the datum for the new catalyst, and the stability index is numerically equal to such percentage. These data established that the chromia-alumina catalyst containing 1% bentonite is better than either the catalyst containing 0.5% bentonite (excess coking after aging) or the catalyst containing 2% bentonite (low conversion and objectionably poor activity after aging), but that catalysts containing all three concentrations of bentonite are sufficiently superior to unstabilized catalyst to constitute a very significant improvement thereover.

EXAMPLE V

By methods such as previously indicated, a basis is established for the interpretation that the sodium bentonite effectively stabilizes a chromia-on-alumina catalyst if the sodium bentonite is admixed with the alumina trihydrate by first dispersing the sodium bentonite in an aqueous acidic solution, and thereafter, impregnating acid and sodium bentonite dispersion into the alumina trihydrate prior to the extrusion of the particles and if the sodium bentonite concentration is within the critical range from 0.5% to 2% of the gamma alumina. The sodium bentonite thus introduced in about 1% concentration apparently becomes a surprising effective stabilizing component of the catalyst, which can be prepared by a manufacturing method which in other respects follows the pattern of the previously described patent applications of the assignee herein:

Obviously, many modifications and variations of the invention as hereinbefore set forth may be made without departing from the spirit and scope thereof, and therefore only such limitations should be imposed as are indicated in the appended claims.

We claim:

1. The method of preparing a stabilized catalyst characterized by the presence of a minor amount of chromia in a predominantly alumina carrier, comprising: dispersing a swelling, water-dispersible sodium bentonite in a dilute solution of aqueous nitric acid; forming a mixture of alumina trihydrate powder and said dispersion of bentonite in aqueous nitric acid, said mixture containing sufficient bentonite to provide from 0.5% to 2% bentonite in the alumina; subjecting said mixture to extrusion to form pellets; converting the extruded pellets to gamma alumina pellets by an elevated temperature partial dehydration treatment; reducing the surface area of the gamma alumina pellets to the range from about 60 m.$^2$/g. to about 100 m.$^2$/g. by treatment at temperature conditions more severe than employed in preparing said gamma alumina, said alumina pellets constituting stabilized alumina carrier particles; impregnating the stabilized alumina carrier particles of reduced surface area with chromic acid solution; and calcining the chromic acid impregnated alumina pellets.

2. The method of claim 1, in which the completed catalyst contains about 1% bentonite.

Table I

| Cat. | Percent bent. | Conversion | | | Coke | | | Butene | | | Butadiene | | |
|---|---|---|---|---|---|---|---|---|---|---|---|---|---|
| | | New | Aged | S.I. | New | Aged | S.I. | New | Aged | S.I. | New | Aged | S.I. |
| A | 0.5 | 60 | 60 | 100 | 3.0 | 5.0 | | 58 | 52 | 89 | 19 | 25 | 132 |
| B | 1.0 | 64 | 58 | 91 | 2.2 | 2.3 | | 68 | 62 | 92 | 19 | 23 | 121 |
| C | 2.0 | | 46 | | | 1.8 | | | 60 | | | 21 | |

References Cited in the file of this patent
UNITED STATES PATENTS

| | | |
|---|---|---|
| 2,408,207 | Garrison | Sept. 24, 1946 |
| 2,410,436 | Ewing | Nov. 5, 1946 |
| 2,489,333 | Shabaker | Nov. 29, 1949 |
| 2,551,580 | Bond | May 8, 1951 |
| 2,759,899 | Hanson | Aug. 21, 1956 |

UNITED STATES PATENT OFFICE
CERTIFICATE OF CORRECTION

Patent No. 2,945,823            July 19, 1960

Edward B. Cornelius et al.

It is hereby certified that error appears in the printed specification of the above numbered patent requiring correction and that the said Letters Patent should read as corrected below.

Column 1, line 66, for "are" read -- area --; column 2, line 6, for "low" read -- lower --; line 60, for ".0.5%" read -- 0.5% --; column 3, line 24, for "It" read -- In --; column 5, line 3, for "elevated" read -- evaluated --; line 5, strike out "and"; same column 5, line 13, for "2.0" read -- 2.0% --; column 6, line 4, for "surprising" read -- surprisingly --; lines 31 and 32, for "alumina, said alumina pellets constituting stabilized alumore severe than employed in preparing said gamma" read -- more severe than employed in preparing said gamma alumina, said alumina pellets constituting stabilized alu- --.

Signed and sealed this 10th day of January 1961.

(SEAL)
Attest:

KARL H. AXLINE
Attesting Officer

ROBERT C. WATSON
Commissioner of Patents